Nov. 20, 1945.　　　　R. G. OWEN　　　　2,389,385
RECEPTACLE
Filed Aug. 2, 1944
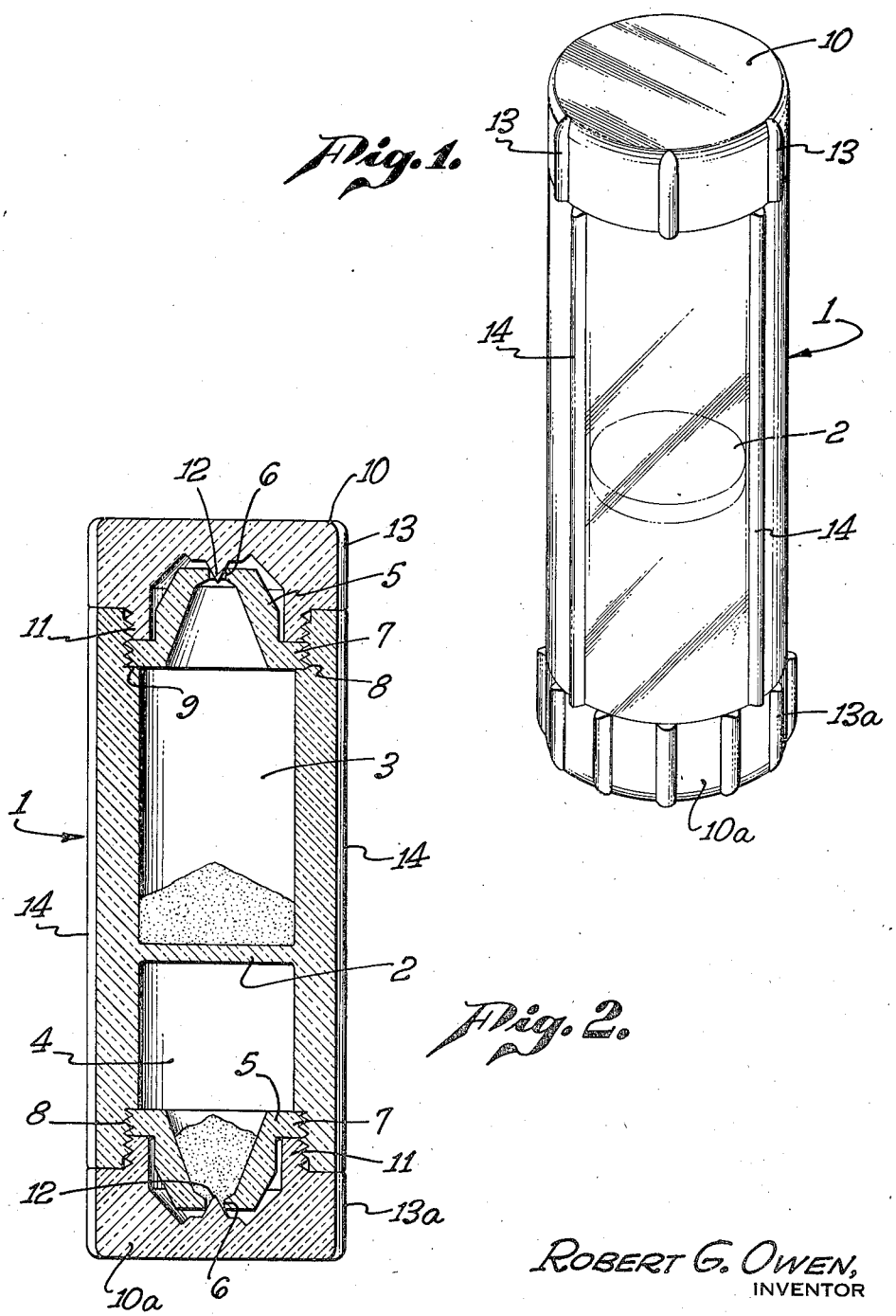
Robert G. Owen,
INVENTOR Patented Nov. 20, 1945

2,389,385

UNITED STATES PATENT OFFICE 2,389,385

RECEPTACLE

Robert G. Owen, Sherman Oaks, Calif., assignor to Robert H. Clark, West Los Angeles, Calif.

Application August 2, 1944, Serial No. 547,706

3 Claims. (Cl. 65—45)

My invention relates to receptacles for containing materials and has particular reference to a holder of the type which may be readily transported without danger of inadvertent loss of all or a portion of the contents.

The general purpose of my invention is to provide a receptacle or container which may be employed for the purpose of providing a package which may be readily carried upon the person and from which the contents may be readily removed in small amounts but which is provided with closures which, when in place thereon, effectively prevent the inadvertent loss of any of the contents. The receptacle of my invention is particularly adapted for use as a condiment holder in which salt, pepper or similar materials may be contained, the receptacle being provided with a removable cap and an inner partial closure through which a portion of the contents may be shaken out of the container but when the outer closure or cap is in place thereon it effectively seals the openings in the inner closure to prevent the inadvertent spilling of the contents and rendering the receptacle air and moisture proof.

Another object of my invention is to provide a receptacle of the character described which is provided with a central partition adapting the container to hold two different kinds of contents, such as salt in one end of the container and pepper in the other end of the container, each of the ends of the container having an inner partial closure which constitutes a shaker top through which the contents may be removed when desired.

Another object of my invention is to provide a receptacle of the character described in the preceding paragraph, in which ribs or other projections or depressions may be provided at opposite ends of the receptacle to permit a person to determine which end of the receptacle contains a particular kind of contents merely by feeling, thus adapting the receptacle for use in the dark.

Another object of my invention is to provide a receptacle of the character described which is formed with an exterior shape such as will prevent the receptacle from rolling if inadvertently dropped or laid on its side.

Another object of my invention is to provide a device of the character described wherein the receptacle is made of transparent material such as transparent Celluloid or one of the thermoplastics, permitting the contents to be viewed.

Other objects and advantages of my invention will be apparent from a study of the following specifications, read in connection with the accompanying drawing, wherein Fig. 1 is a perspective view of a receptacle constructed in accordance with my invention; and Fig. 2 is a vertical sectional view through the receptacle, the shaker tops and the closures employed at the opposite ends of the holder.

For purposes of description herein, the receptacle of my invention will be described as a condiment holder particularly adapted for holding salt and pepper though it will be understood by those skilled in this art that the same construction may be readily employed for holding various types of contents such as face powder, hand lotion, quinine and sulpha drugs, saccharine tablets and the like.

Referring to the drawing, I have illustrated my condiment holder as an elongated cylindrical body member or container 1 which is preferably divided into an upper and a lower section by means of a transparent partition 2 to divide the interior of the holder into two separate chambers 3 and 4, each of which may contain a supply of a different kind of condiment such as salt in the chamber 3 and pepper in the chamber 4. The end of each of the chambers is adapted to receive a shaker top 5 preferably constructed as a substantially cup-shaped element having a central bore 6 in the base of the cup and a radially extending flange 7 at the rim of the cup threaded as indicated at 8 to be threaded into the end of the holder 1. I prefer to form a definite shoulder 9 upon which the flange 8 will bear so as to provide an ample area against which compression forces may be exerted by a closure member 10 when the closure member is screwed into place.

The closure member 10 is preferably formed as a cup-shaped element having an annular axially extending flange 11 threaded so as to permit it to be screwed into the same threads by which the shaker top 5 is held in place upon the holder, the lower end of the flange 11 bearing upon the radially extending flange 7 of the shaker top. The base of the interior of the cup-shape is provided with a cone-shaped projection 12 which is so formed as to extend into and close off the bore 6 of the shaker top when the closure 10 is screwed into place. The dimensions of the closure member are so designed that the bore 6 will be completely sealed at the same time that the flange 11 of the closure is snugly engaged upon the flange 7 of the shaker top.

In view of the fact that the holder is provided to receive and contain two different condiments, I identify the opposite ends of the holder by forming projections, indentations or other means which can be felt by the fingers, differently arranged at opposite ends of the container. In the form of the device illustrated herein, the identification is made by forming upon the cylindrical walls of the cover 10 a plurality of radially projecting ribs 13 while upon the cover 10a at the opposite end of the holder I form a plurality of ribs 13a but of a number sufficiently different from the number of ribs 13 so as to permit the ready identification of the opposite ends of the holder.

Also to prevent the cylindrical holder 1 from rolling if laid upon its side or inadvertently dropped, I prefer to form the exterior of the walls of the holder of such shape as will effectively prevent such rolling. In the form of the device shown herein this shape is provided by forming longitudinally extending ribs 14, preferably four in number, these ribs projectng sufficently beyond the cylindrical walls of the holder to stop any appreciable rolling movement of the holder.

It will therefore be observed that I have provided a condiment holder which is peculiarly adapted to be carried in lunch pails, picnic baskets and the like without fear of inadvertent loss of the contents and one in which several different condiments may be carried, readily identifiable by sight or by feeling, thus adapting the holder for use in the dark where occasion demands.

While I have shown and described the preferred embodiment of my invention, I do not desire to be limited to any of the details of construction shown or described herein, except as defined in the appended claims.

I claim:

1. In a condiment holder, the combination of a body member having a condiment receiving chamber formed therein, internal threads formed in the end of said body member, a shaker top threadedly secured in said end, a closure member threadedly secured to said end by the same threads employed to secure the shaker top, a circular opening in said shaker top concentric with said threads, and a conical projection on said closure adapted for reception in and sealing off of said opening when said closure is in place upon said body.

2. In a condiment holder, the combination of a body member having a condiment receiving chamber formed therein, internal threads formed in the end of said body member, a radially extending shoulder formed in said end of said body member, a shaker top having an opening through which the condiment may be shaken and having a radially extending flange threaded into said threads and bearing upon said shoulder, and a closure member having an annular flange threadedly received in said end of said body member, the end of said flange bearing upon said radial flange of said shaker top, and means formed upon said closure for sealing off the opening in said shaker top.

3. In a condiment holder, a hollow body member having a transverse partition therein dividing the interior of said body member into two separate condiment receiving chambers, a shaker top having an opening through which condiment may be shaken from the container secured in each end of said body member, a closure member for each end of said body member having means formed thereon for sealing the opening in the adjacent shaker top, and means at each end of said closure member for distinguishing the ends of said holder from each other, said distinguishing means comprising a plurality of projections formed upon the closure members and comprising a different number on each of said closures.

ROBERT G. OWEN.